US009091238B2

(12) United States Patent
McAlister et al.

(10) Patent No.: US 9,091,238 B2
(45) Date of Patent: Jul. 28, 2015

(54) SYSTEMS AND METHODS FOR PROVIDING MOTION AMPLIFICATION AND COMPENSATION BY FLUID DISPLACEMENT

(71) Applicants: McAlister Technologies, LLC, Phoenix, AZ (US); Advanced Green Technologies, LLC, Chandler, AZ (US)

(72) Inventors: Roy Edward McAlister, Phoenix, AZ (US); David Grottenthaler, Phoenix, AZ (US)

(73) Assignees: ADVANCED GREEN TECHNOLOGIES, LLC, Chandler, AZ (US); MCALISTER TECHNOLOGIES, LLC, Phoenix, AZ (US)

( * ) Notice: Subject to any disclaimer, the term of this patent is extended or adjusted under 35 U.S.C. 154(b) by 0 days.

(21) Appl. No.: 13/842,636

(22) Filed: Mar. 15, 2013

(65) Prior Publication Data

US 2014/0131467 A1 May 15, 2014

Related U.S. Application Data

(60) Provisional application No. 61/725,446, filed on Nov. 12, 2012.

(51) Int. Cl.
*B05B 1/30* (2006.01)
*F02M 47/02* (2006.01)
(Continued)

(52) U.S. Cl.
CPC ....... *F02M 51/0603* (2013.01); *F02D 19/0689* (2013.01); *F02M 21/0254* (2013.01);
(Continued)

(58) Field of Classification Search
CPC .......... F02M 51/0603; F02M 2200/16; F02M 61/08; F02M 61/167; F02M 51/005; F02M 2200/707; F02M 2200/703; F02M 63/0026; F02M 2200/26; F02M 63/0057; F02M 51/0671; F02M 61/16; F02M 57/022; F02M 59/022; F02M 59/16; F02M 51/0685; F02M 61/162; F02M 59/14; F02M 57/025; F02M 59/105; F02M 57/06; F02M 21/0254; F16K 31/007; F02B 2075/125; F02B 1/04; F02B 3/06; F02B 17/005; Y02T 10/123; Y02T 10/36; Y02T 10/32; Y10S 239/90; F02D 19/0689
USPC ................. 239/5, 585.1, 585.2, 585.3, 585.4, 239/585.5, 88–92
See application file for complete search history.

(56) References Cited

U.S. PATENT DOCUMENTS

| 802,946 A | 10/1905 | Waterman |
|---|---|---|
| 1,451,384 A | 4/1923 | Whyte |

(Continued)

FOREIGN PATENT DOCUMENTS

| DE | 3443022 | 5/1986 |
|---|---|---|
| DE | 102005060139 | 6/2007 |

(Continued)

OTHER PUBLICATIONS

"Ford DIS/EDIS "Waste Spark" Ignition System." Accessed: Jul. 15, 2010. Printed: Jun. 8, 2011. <http://rockledge.home.comcast.net/~rockledge/RangerPictureGallery/DIS_EDIS.htm>. pp. 1-6.

(Continued)

*Primary Examiner* — Len Tran
*Assistant Examiner* — Steven M Cernoch
(74) *Attorney, Agent, or Firm* — Loeb & Loeb, LLP (57) ABSTRACT

The present technology relates generally systems and methods for providing motion amplification and compensation by fluid displacement in fuel injector systems. For example, some embodiments of gaseous fuel injectors include a piezoelectric actuator and a motion transfer system coupled to the piezoelectric actuator. The motion transfer system includes a housing, a first piston having a first effective area disposed in the housing, and a second piston having a second effective area disposed in the housing. The second effective area is less than the first effective area and the first and second pistons define a fluid chamber therebetween. The motion transfer system can amplify actuation of a fuel injector valve.

13 Claims, 5 Drawing Sheets

(51) Int. Cl.
*F02M 51/06* (2006.01)
*F02D 19/06* (2006.01)
*F02M 21/02* (2006.01)
*F02M 57/06* (2006.01)
*F02B 17/00* (2006.01)

(52) U.S. Cl.
CPC .............. *F02B17/005* (2013.01); *F02M 57/06* (2013.01); *F02M 2200/703* (2013.01); *Y02T 10/32* (2013.01); *Y02T 10/36* (2013.01)

(56) References Cited

U.S. PATENT DOCUMENTS

| | | | |
|---|---|---|---|
| 1,765,237 A | | 7/1938 | King |
| 2,255,203 A | | 9/1941 | Wiegand |
| 2,630,761 A | * | 3/1953 | Mashinter ................ 417/394 |
| 2,721,100 A | | 10/1955 | Bodine |
| 3,058,453 A | | 10/1962 | May |
| 3,060,912 A | | 10/1962 | May |
| 3,081,758 A | | 3/1963 | May |
| 3,243,335 A | | 3/1966 | Faile |
| 3,373,724 A | | 3/1968 | Papst |
| 3,520,961 A | | 7/1970 | Suda et al. |
| 3,594,877 A | | 7/1971 | Suda et al. |
| 3,608,050 A | | 9/1971 | Carman et al. |
| 3,614,486 A | | 10/1971 | Smiley |
| 3,689,293 A | | 9/1972 | Beall |
| 3,875,612 A | | 4/1975 | Poitras |
| 3,926,169 A | | 12/1975 | Leshner et al. |
| 3,931,438 A | | 1/1976 | Beall |
| 3,960,995 A | | 6/1976 | Kourkene |
| 3,976,039 A | | 8/1976 | Henault |
| 3,997,352 A | | 12/1976 | Beall |
| 4,020,803 A | | 5/1977 | Thuren et al. |
| 4,066,046 A | | 1/1978 | McAlister |
| 4,095,580 A | | 6/1978 | Murray et al. |
| 4,101,076 A | | 7/1978 | Bart |
| 4,122,816 A | | 10/1978 | Fitzgerald et al. |
| 4,135,481 A | | 1/1979 | Resler, Jr. |
| 4,203,393 A | | 5/1980 | Giardini |
| 4,281,797 A | | 8/1981 | Kimata et al. |
| 4,330,732 A | | 5/1982 | Lowther |
| 4,332,223 A | | 6/1982 | Dalton |
| 4,364,342 A | | 12/1982 | Asik |
| 4,377,455 A | | 3/1983 | Kadija et al. |
| 4,381,740 A | | 5/1983 | Crocker |
| 4,382,189 A | | 5/1983 | Wilson |
| 4,391,914 A | | 7/1983 | Beall |
| 4,469,160 A | | 9/1984 | Giamei |
| 4,483,485 A | | 11/1984 | Kamiya et al. |
| 4,511,612 A | | 4/1985 | Huther et al. |
| 4,528,270 A | | 7/1985 | Matsunaga |
| 4,536,452 A | | 8/1985 | Stempin et al. |
| 4,544,096 A | * | 10/1985 | Burnett ..................... 239/92 |
| 4,567,857 A | | 2/1986 | Houseman et al. |
| 4,574,037 A | | 3/1986 | Samejima et al. |
| 4,677,960 A | | 7/1987 | Ward |
| 4,684,211 A | | 8/1987 | Weber et al. |
| 4,688,538 A | | 8/1987 | Ward et al. |
| 4,733,646 A | | 3/1988 | Iwasaki |
| 4,736,718 A | | 4/1988 | Linder |
| 4,742,265 A | | 5/1988 | Giachino et al. |
| 4,760,818 A | | 8/1988 | Brooks et al. |
| 4,760,820 A | | 8/1988 | Tozzi |
| 4,774,914 A | | 10/1988 | Ward |
| 4,774,919 A | | 10/1988 | Matsuo et al. |
| 4,805,573 A | | 2/1989 | Macfarlane et al. |
| 4,834,033 A | | 5/1989 | Larsen |
| 4,841,925 A | | 6/1989 | Ward |
| 4,877,187 A | * | 10/1989 | Daly .......................... 239/89 |
| 4,905,962 A | | 3/1990 | Iljin |
| 4,922,883 A | | 5/1990 | Iwasaki |
| 4,949,936 A | | 8/1990 | Messina |
| 4,958,774 A | | 9/1990 | Taylor |
| 4,967,708 A | | 11/1990 | Linder et al. |
| 4,977,873 A | | 12/1990 | Cherry et al. |
| 4,982,708 A | | 1/1991 | Stutzenberger |
| 5,034,852 A | | 7/1991 | Rosenberg |
| 5,055,435 A | | 10/1991 | Hamanaka et al. |
| 5,056,496 A | | 10/1991 | Morino et al. |
| 5,076,223 A | | 12/1991 | Harden et al. |
| 5,094,429 A | | 3/1992 | Dostert |
| 5,095,742 A | | 3/1992 | James et al. |
| 5,109,817 A | | 5/1992 | Cherry |
| 5,131,376 A | | 7/1992 | Ward et al. |
| 5,163,623 A | | 11/1992 | Seino |
| 5,193,515 A | | 3/1993 | Oota et al. |
| 5,207,208 A | | 5/1993 | Ward |
| 5,211,142 A | | 5/1993 | Matthews et al. |
| 5,220,901 A | | 6/1993 | Morita et al. |
| 5,226,628 A | | 7/1993 | Daly |
| 5,267,601 A | | 12/1993 | Dwivedi |
| 5,297,518 A | | 3/1994 | Cherry |
| 5,305,360 A | | 4/1994 | Remark et al. |
| 5,325,888 A | | 7/1994 | Stary |
| 5,328,094 A | | 7/1994 | Goetzke et al. |
| 5,329,606 A | | 7/1994 | Andreassen |
| 5,377,633 A | | 1/1995 | Wakeman |
| 5,388,984 A | | 2/1995 | Meslif |
| 5,392,745 A | | 2/1995 | Beck |
| 5,421,299 A | | 6/1995 | Cherry |
| 5,427,132 A | | 6/1995 | Fenner |
| 5,435,286 A | | 7/1995 | Carroll, III et al. |
| 5,439,532 A | | 8/1995 | Fraas |
| 5,456,241 A | | 10/1995 | Ward |
| 5,475,772 A | | 12/1995 | Hung et al. |
| 5,497,744 A | | 3/1996 | Nagaosa et al. |
| 5,517,961 A | | 5/1996 | Ward |
| 5,531,199 A | | 7/1996 | Bryant et al. |
| 5,549,746 A | | 8/1996 | Scott et al. |
| 5,584,490 A | | 12/1996 | Inoue et al. |
| 5,588,299 A | | 12/1996 | DeFreitas |
| 5,605,125 A | | 2/1997 | Yaoita |
| 5,607,106 A | | 3/1997 | Bentz et al. |
| 5,608,832 A | | 3/1997 | Pfandl et al. |
| 5,662,389 A | | 9/1997 | Trugilio et al. |
| 5,676,026 A | | 10/1997 | Tsuboi et al. |
| 5,697,554 A | | 12/1997 | Auwaerter et al. |
| 5,699,253 A | | 12/1997 | Puskorius et al. |
| 5,702,761 A | | 12/1997 | DiChiara, Jr. et al. |
| 5,704,321 A | | 1/1998 | Suckewer et al. |
| 5,704,553 A | | 1/1998 | Wieczorek et al. |
| 5,715,788 A | | 2/1998 | Tarr et al. |
| 5,738,818 A | | 4/1998 | Atmur et al. |
| 5,746,171 A | | 5/1998 | Yaoita |
| 5,767,026 A | | 6/1998 | Kondoh et al. |
| 5,797,427 A | | 8/1998 | Buescher |
| 5,806,581 A | | 9/1998 | Haasch et al. |
| 5,816,217 A | | 10/1998 | Wong |
| 5,853,175 A | | 12/1998 | Udagawa |
| 5,863,326 A | | 1/1999 | Nause et al. |
| 5,876,659 A | | 3/1999 | Yasutomi et al. |
| 5,915,272 A | | 6/1999 | Foley et al. |
| 5,941,207 A | | 8/1999 | Anderson et al. |
| 6,017,390 A | | 1/2000 | Charych et al. |
| 6,026,568 A | | 2/2000 | Atmur et al. |
| 6,042,028 A | | 3/2000 | Xu |
| 6,062,498 A | | 5/2000 | Klopfer |
| 6,081,183 A | | 6/2000 | Mading et al. |
| 6,085,990 A | | 7/2000 | Augustin |
| 6,092,501 A | | 7/2000 | Matayoshi et al. |
| 6,092,507 A | | 7/2000 | Bauer et al. |
| 6,093,338 A | | 7/2000 | Tani et al. |
| 6,102,303 A | | 8/2000 | Bright et al. |
| 6,138,639 A | | 10/2000 | Hiraya et al. |
| 6,173,913 B1 | | 1/2001 | Shafer et al. |
| 6,185,355 B1 | | 2/2001 | Hung |
| 6,189,522 B1 | | 2/2001 | Moriya |
| 6,253,728 B1 | | 7/2001 | Matayoshi et al. |
| 6,267,307 B1 | | 7/2001 | Pontoppidan |
| 6,311,950 B1 | * | 11/2001 | Kappel et al. ............. 251/129.06 |
| 6,335,065 B1 | | 1/2002 | Steinlage et al. |
| 6,360,721 B1 | | 3/2002 | Schuricht et al. |
| 6,371,439 B1 | | 4/2002 | Trevisan |

(56) References Cited

U.S. PATENT DOCUMENTS

| | | |
|---|---|---|
| 6,374,781 B1 | 4/2002 | Kato |
| 6,378,485 B2 | 4/2002 | Elliott |
| 6,386,178 B1 | 5/2002 | Rauch |
| 6,450,424 B1 | 9/2002 | Horbelt |
| 6,453,660 B1 | 9/2002 | Johnson et al. |
| 6,455,173 B1 | 9/2002 | Marijnissen et al. |
| 6,478,007 B2 | 11/2002 | Miyashita et al. |
| 6,494,382 B1 | 12/2002 | Stier |
| 6,506,336 B1 | 1/2003 | Beall |
| 6,517,011 B1 | 2/2003 | Ayanji et al. |
| 6,520,434 B1 | 2/2003 | Reiter |
| 6,531,712 B1 | 3/2003 | Boecking |
| 6,532,315 B1 | 3/2003 | Hung et al. |
| 6,567,599 B2 | 5/2003 | Hung |
| 6,578,775 B2 | 6/2003 | Hokao |
| 6,583,901 B1 | 6/2003 | Hung |
| 6,584,244 B2 | 6/2003 | Hung |
| 6,585,171 B1 | 7/2003 | Boecking |
| 6,587,239 B1 | 7/2003 | Hung |
| 6,595,436 B2 | 7/2003 | Kirzhner et al. |
| 6,615,899 B1 | 9/2003 | Woodward et al. |
| 6,621,964 B2 | 9/2003 | Quinn et al. |
| 6,663,027 B2 | 12/2003 | Jameson et al. |
| 6,672,277 B2 | 1/2004 | Yasuoka et al. |
| 6,700,306 B2 | 3/2004 | Nakamura et al. |
| 6,705,274 B2 | 3/2004 | Kubo |
| 6,719,224 B2 | 4/2004 | Enomoto et al. |
| 6,722,340 B1 | 4/2004 | Sukegawa et al. |
| 6,725,826 B2 | 4/2004 | Esteghlal |
| 6,745,744 B2 | 6/2004 | Suckewer et al. |
| 6,749,043 B2 | 6/2004 | Brown et al. |
| 6,752,324 B1 | 6/2004 | Mattes |
| 6,755,175 B1 | 6/2004 | McKay et al. |
| 6,763,811 B1 | 7/2004 | Tamol, Sr. |
| 6,779,513 B2 | 8/2004 | Pellizzari et al. |
| 6,787,973 B2 | 9/2004 | Frank et al. |
| 6,811,103 B2 | 11/2004 | Gurich et al. |
| 6,814,313 B2 | 11/2004 | Petrone et al. |
| 6,832,588 B2 | 12/2004 | Herden et al. |
| 6,840,493 B2 | 1/2005 | York et al. |
| 6,845,920 B2 | 1/2005 | Sato et al. |
| 6,851,413 B1 | 2/2005 | Tamol, Sr. |
| 6,871,630 B2 | 3/2005 | Herden et al. |
| 6,871,833 B1 | 3/2005 | Zeh et al. |
| 6,883,474 B2 | 4/2005 | Bucknor |
| 6,883,490 B2 | 4/2005 | Jayne |
| 6,898,355 B2 | 5/2005 | Johnson et al. |
| 6,899,076 B2 | 5/2005 | Funaki et al. |
| 6,904,893 B2 | 6/2005 | Hotta et al. |
| 6,912,998 B1 | 7/2005 | Rauznitz et al. |
| 6,925,983 B2 | 8/2005 | Herden et al. |
| 6,938,597 B2 | 9/2005 | Klein et al. |
| 6,940,213 B1 | 9/2005 | Heinz et al. |
| 6,976,683 B2 | 12/2005 | Eckert et al. |
| 6,994,073 B2 | 2/2006 | Tozzi et al. |
| 7,007,658 B1 | 3/2006 | Cherry et al. |
| 7,013,863 B2 | 3/2006 | Shiraishi et al. |
| 7,025,358 B2 | 4/2006 | Ueta et al. |
| 7,032,833 B2 * | 4/2006 | Bocking ................ 239/102.2 |
| 7,032,845 B2 | 4/2006 | Dantes et al. |
| 7,066,399 B2 * | 6/2006 | Hohl .................... 239/102.2 |
| 7,070,126 B2 | 7/2006 | Shinogle |
| 7,073,480 B2 | 7/2006 | Shiraishi et al. |
| 7,077,100 B2 | 7/2006 | Vogel et al. |
| 7,077,108 B2 | 7/2006 | Fujita et al. |
| 7,083,114 B2 * | 8/2006 | Maeurer et al. ......... 239/102.2 |
| 7,086,376 B2 | 8/2006 | McKay |
| 7,104,246 B1 | 9/2006 | Gagliano et al. |
| 7,104,250 B1 | 9/2006 | Yi et al. |
| 7,121,253 B2 | 10/2006 | Shiraishi et al. |
| 7,131,426 B2 | 11/2006 | Ichinose et al. |
| 7,140,347 B2 | 11/2006 | Suzuki et al. |
| 7,140,562 B2 | 11/2006 | Holzgrefe et al. |
| 7,213,613 B2 | 5/2007 | Spakowski et al. |
| 7,214,883 B2 | 5/2007 | Leyendecker |
| 7,225,790 B2 | 6/2007 | Bartunek et al. |
| 7,249,578 B2 | 7/2007 | Fricke et al. |
| 7,255,290 B2 | 8/2007 | Bright et al. |
| 7,278,392 B2 | 10/2007 | Zillmer et al. |
| 7,305,971 B2 | 12/2007 | Fujii |
| 7,309,032 B2 * | 12/2007 | Fischer et al. ............ 239/585.1 |
| 7,418,940 B1 | 9/2008 | Yi et al. |
| 7,419,103 B2 | 9/2008 | Pauer |
| 7,481,043 B2 | 1/2009 | Hirata et al. |
| 7,554,250 B2 | 6/2009 | Kadotani et al. |
| 7,625,531 B1 | 12/2009 | Coates et al. |
| 7,626,315 B2 | 12/2009 | Nagase |
| 7,650,873 B2 | 1/2010 | Hofbauer et al. |
| 7,694,855 B2 | 4/2010 | Chastine et al. |
| 7,703,775 B2 | 4/2010 | Matsushita et al. |
| 7,707,832 B2 | 5/2010 | Commaret et al. |
| 7,714,483 B2 | 5/2010 | Hess et al. |
| 7,728,489 B2 | 6/2010 | Heinz et al. |
| 7,849,833 B2 | 12/2010 | Toyoda |
| 7,850,091 B2 | 12/2010 | Boecking |
| 7,918,212 B2 | 4/2011 | Verdeja et al. |
| 7,938,102 B2 | 5/2011 | Sherry |
| 8,069,836 B2 | 12/2011 | Ehresman |
| 8,074,625 B2 | 12/2011 | McAlister |
| 8,191,860 B2 | 6/2012 | Eschborn et al. |
| 8,267,063 B2 | 9/2012 | McAlister |
| 8,297,254 B2 | 10/2012 | McAlister |
| 8,311,723 B2 | 11/2012 | McAlister |
| 2002/0017573 A1 | 2/2002 | Sturman |
| 2002/0084793 A1 | 7/2002 | Hung et al. |
| 2002/0131171 A1 | 9/2002 | Hung |
| 2002/0131666 A1 | 9/2002 | Hung et al. |
| 2002/0131673 A1 | 9/2002 | Hung |
| 2002/0131674 A1 | 9/2002 | Hung |
| 2002/0131706 A1 | 9/2002 | Hung |
| 2002/0131756 A1 | 9/2002 | Hung |
| 2002/0141692 A1 | 10/2002 | Hung |
| 2002/0150375 A1 | 10/2002 | Hung et al. |
| 2002/0151113 A1 | 10/2002 | Hung et al. |
| 2002/0162900 A1 | 11/2002 | Boecking |
| 2003/0038259 A1 | 2/2003 | Boecking |
| 2003/0160202 A1 | 8/2003 | Boecking |
| 2003/0192965 A1 | 10/2003 | Maier et al. |
| 2004/0008989 A1 | 1/2004 | Hung |
| 2005/0098663 A1 | 5/2005 | Ishii |
| 2005/0247803 A1 * | 11/2005 | Liskow ................... 239/102.2 |
| 2005/0255011 A1 | 11/2005 | Greathouse et al. |
| 2006/0005738 A1 | 1/2006 | Kumar |
| 2006/0005739 A1 | 1/2006 | Kumar |
| 2006/0108452 A1 | 5/2006 | Anzinger et al. |
| 2006/0255185 A1 | 11/2006 | Christiani et al. |
| 2007/0189114 A1 | 8/2007 | Reiner et al. |
| 2009/0078798 A1 | 3/2009 | Gruendl et al. |
| 2009/0093951 A1 | 4/2009 | McKay et al. |
| 2009/0200406 A1 | 8/2009 | Kronberger |
| 2012/0204831 A1 | 8/2012 | McAlister |

FOREIGN PATENT DOCUMENTS

| | | |
|---|---|---|
| EP | 1209351 | 5/2002 |
| EP | 2402587 | 12/2012 |
| GB | 1038490 | 8/1966 |
| JP | 2001-512564 | 8/2001 |
| JP | 2006-097659 | 4/2006 |
| JP | 2006-105067 | 4/2006 |
| JP | 2008-31853 | 2/2008 |
| JP | 2008-520888 | 6/2008 |
| WO | WO9407022 | 3/1994 |
| WO | WO 2008017576 | 2/2008 |

OTHER PUBLICATIONS

"P dV's Custom Data Acquisition Systems Capabilities." PdV Consulting. Accessed: Jun. 28, 2010. Printed: May 16, 2011. <http://www.pdvconsult.com/capabilities%20-%20daqsys.html>. pp. 1-10.

"Piston motion equations." Wikipedia, the Free Encyclopedia. Published: Jul. 4, 2010. Accessed: Aug. 7, 2010. Printed: Aug. 7, 2010. <http://en.wikipedia.org/wiki/Dopant>. pp. 1-9.

(56) References Cited

OTHER PUBLICATIONS

"Piston Velocity and Acceleration." EPI, Inc. Accessed: Jun. 28, 2010. Printed: May 16, 2011. <http://www.epi-eng.com/piston_engine_technology/piston_velocity_and_acceleration.htm>. pp. 1-3.

"SmartPlugs—Aviation." SmartPlugs.com. Published: Sep. 2000. Accessed: May 31, 2011. <http://www.smartplugs.com/news/aeronews0900.htm>. pp. 1-3.

Birchenough, Arthur G. "A Sustained-arc Ignition System for Internal Combustion Engines." Nasa Technical Memorandum (NASA TM-73833). Lewis Research Center. Nov. 1977. pp. 1-15.

Doggett, William. "Measuring Internal Combustion Engine In-Cylinder Pressure with LabVIEW." National Instruments. Accessed: Jun. 28, 2010. Printed: May 16, 2011. <http://sine.ni.com/cs/app/doc/p/id/cs-217>. pp. 1-2.

Erjavec, Jack. "Automotive Technology: a Systems Approach, vol. 2." Thomson Delmar Learning. Clifton Park, NY. 2005. p. 845.

Hollembeak, Barry. "Automotive Fuels & Emissions." Thomson Delmar Learning. Clifton Park, NY. 2005. p. 298.

InfraTec GmbH. "Evaluation Kit for FPI Detectors | Datasheet—Detector Accessory." 2009. pp. 1-2.

Lewis Research Center. "Fabry-Perot Fiber-Optic Temperature Sensor." NASA Tech Briefs. Published: Jan. 1, 2009. Accessed: May 16, 2011. <http://www.techbriefs.com/content/view/2114/32/>.

Riza et al. "All-Silicon Carbide Hybrid Wireless-Wired Optics Temperature Sensor Network Basic Design Engineering for Power Plant Gas Turbines." International Journal of Optomechatronics, vol. 4, Issue 1. Jan 2010. pp. 1-9.

Riza et al. "Hybrid Wireless-Wired Optical Sensor for Extreme Temperature Measurement in Next Generation Energy Efficient Gas Turbines." Journal of Engineering for Gas Turbines and Power, vol. 132, Issue 5. May 2010. pp. 051601-1-51601-11.

International Search Report and Written Opinion for Application No. PCT/US2014/029369; Applicant: McAlister Technologies, LLC; Date of Mailing: Mar. 14, 2014, 16 pages.

\* cited by examiner

SYSTEMS AND METHODS FOR PROVIDING MOTION AMPLIFICATION AND COMPENSATION BY FLUID DISPLACEMENT

CROSS-REFERENCE TO RELATED APPLICATION

The present application claims priority to and the benefit of U.S. Provisional Patent Application No. 61/725,446, filed Nov. 12, 2012, which is incorporated herein by reference in its entirety.

TECHNICAL FIELD

The present technology relates generally to systems and methods for providing motion amplification and compensation by fluid displacement. Particular embodiments are directed to motion transfer systems for use in fuel injectors.

BACKGROUND

Fuel injection systems are typically used to inject a fuel spray into an inlet manifold or a combustion chamber of an engine. Fuel injection systems have become the primary fuel delivery system used in automotive engines, having almost completely replaced carburetors since the late 1980s. The fuel injectors used in these fuel injection systems are generally capable of two basic functions. First, they deliver a metered amount of fuel for each inlet stroke of the engine so that a suitable air-fuel ratio can be maintained for fuel combustion. Second, they disperse fuel to improve the efficiency of the combustion process. Conventional fuel injection systems are typically connected to a pressurized fuel supply, and the fuel can be metered into the combustion chamber by varying the time for which the injectors are open. The fuel can also be dispersed into the combustion chamber by forcing the fuel through a small orifice in the injectors.

DETAILED DESCRIPTION

The present technology relates generally to systems and methods for providing motion amplification and compensation by fluid displacement in fuel injector systems. For example, some embodiments of gaseous fuel injectors include a piezoelectric actuator and a motion transfer system coupled to the piezoelectric actuator. The motion transfer system includes a housing, a first piston having a first effective area disposed in the housing, and a second piston having a second effective area disposed in the housing. The second effective area is smaller than the first effective area, and the first and second pistons define a fluid chamber therebetween. The motion transfer system can amplify actuation of a fuel injector valve.

Specific details of several embodiments of the technology are described below with reference to FIGS. 1-5. Other details describing well-known structures and systems often associated with motion transfer systems, fuel injection systems, and ignition systems have not been set forth in the following disclosure to avoid unnecessarily obscuring the description of the various embodiments of the technology. Many of the details, dimensions, angles, and other features shown in the Figures are merely illustrative of particular embodiments of the technology. Accordingly, other embodiments can have other details, dimensions, angles, and features without departing from the spirit or scope of the present technology. A person of ordinary skill in the art, therefore, will accordingly understand that the technology may have other embodiments with additional elements, or the technology may have other embodiments without several of the features shown and described below with reference to FIGS. 1-5.

Figure 1:
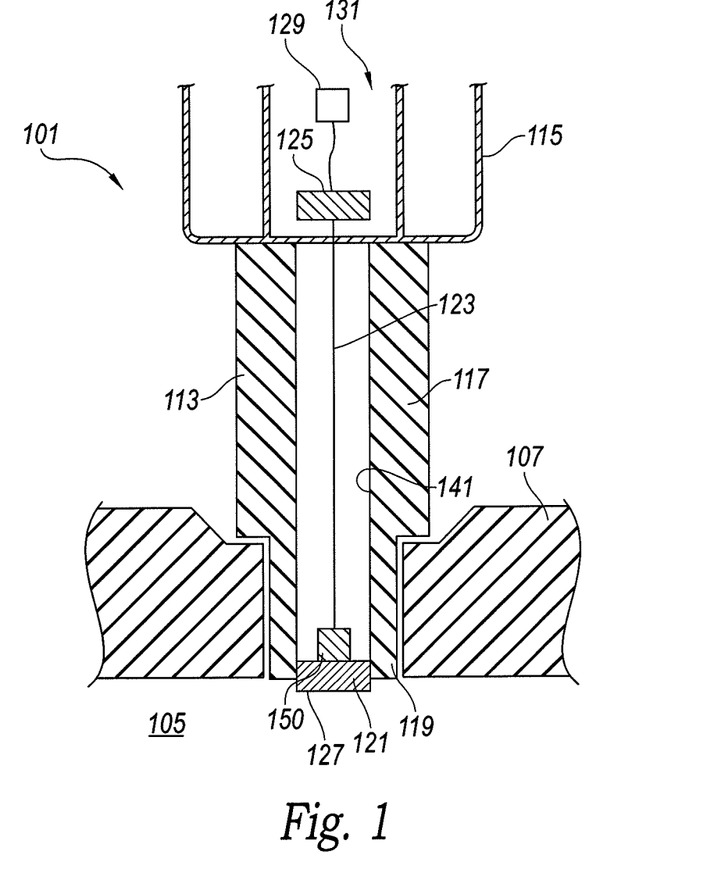
FIG. 1 is a schematic cross-sectional side view of an injector configured in accordance with embodiments of the technology.

FIG. 1 is a schematic cross-sectional side view of an injector 101 configured in accordance with an embodiment of the technology. The injector 101 is configured to inject fuel into a combustion chamber 105 and utilize a motion transfer system to transfer force and linear motion to a reduced, equal or greater motion magnitude. The motion transfer system 150 is schematically illustrated in FIG. 1 and can be positioned at any location on the injector 101 and coupled to any of the features described in detail below. Moreover, in certain embodiments the motion transfer system 150 can be integral with one or more of the valve actuating components described in detail below. Furthermore, although several of the additional features of the illustrated injector 101 described below are shown schematically for purposes of illustration, several of these schematically-illustrated features are described in detail below with reference to various features of embodiments of the disclosure. Accordingly, the relative location, position, size, orientation, etc. of the schematically-illustrated components of the Figures are not intended to limit the present disclosure.

In the illustrated embodiment, the injector 101 includes a casing or body 113 having a middle portion 117 extending between a base portion 115 and a nozzle portion 119. The nozzle portion 119 extends at least partially through a port in an engine head 107 to position the nozzle portion 119 at the interface with the combustion chamber 105. The injector 101 further includes a fuel passage or channel 141 extending through the body 113 from the base portion 115 to the nozzle portion 119. The channel 141 is configured to allow fuel to flow through the body 113. The channel 141 is also configured to allow other components, such as a valve operator assembly 131, an actuator 123, instrumentation components, and/or energy source components of the injector 101 to pass through the body 113. According to additional features of the illustrated embodiment, the nozzle portion 119 can include one or more ignition features for generating an ignition event for igniting the fuel in the combustion chamber 105. For example, the injector 101 can include any of the ignition features disclosed in U.S. patent application Ser. No. 12/841,170 entitled "INTEGRATED FUEL INJECTORS AND IGNITERS AND ASSOCIATED METHODS OF USE AND MANUFACTURE," filed Jul. 21, 2010, which is incorporated herein by reference in its entirety.

In certain embodiments, the actuator 123 can be a cable, stiffened cable, or rod that has a first end portion that is operatively coupled to a flow control device or valve 121 carried by the nozzle portion 119. The actuator 123 can be integral with the flow valve 121 or a separate component from to the flow valve 121. As such, the flow valve 121 is positioned proximate to the interface with the combustion chamber 105. Although not shown in FIG. 1, in certain embodiments the injector 101 can include more than one flow valve 121, as well as one or more check valves positioned proximate to the combustion chamber 105, as well as at other locations on the body 113. For example, the injector 101 can include any of the valves and associated valve actuation assemblies as disclosed in the patent applications incorporated by reference above.

The position of the flow valve 121 can be controlled by the valve operator assembly 131. For example, the valve operator assembly 131 can include a plunger, prime mover, or driver 125 that is operatively coupled to the actuator 123. The actuator 123 and/or driver 125 can further be coupled to a processor or controller 129. As explained in detail below with reference to various embodiments of the disclosure, the driver 125 and/or actuator 123 can be responsive to the controller 129. The controller 129 can be positioned on the injector 101 or remotely from the injector 101. The controller 129 and/or the driver 125 are configured to rapidly and precisely actuate the actuator 123 to inject fuel into the combustion chamber 105 by moving the flow valve 121 via the actuator 123. For example, in certain embodiments, the flow valve 121 can move outwardly (e.g., toward the combustion chamber 105) and, in other embodiments, inwardly (e.g., away from the combustion chamber 105) to meter and control injection of the fuel. Moreover, the driver 125 can add tension to the actuator 123 to keep the flow valve 121 in a closed or seated position, and the driver 125 can relax or relieve the tension in the actuator 123 to allow the flow valve 121 to inject fuel. In other embodiments, the flow valve 121 may be opened and closed depending on the pressure of the fuel in the body 113, without the use of an actuator cable or rod. Additionally, although only a single flow valve 121 is shown at the interface of the combustion chamber 105, in other embodiments the flow valve 121 can be positioned at other locations on the injector 101 and can be actuated in combination with one or more other flow valves or check valves.

The injector 101 can further include a sensor and/or transmitting component 127 for detecting and relaying combustion chamber properties, such as temperatures and pressure, and providing feedback to the controller 129. The sensor 127 can be integral to the valve 121, the actuator 123, and/or the nozzle portion 119 or a separate component that is carried by any of these portions of the injector 101. In one embodiment, the actuator 123 can be formed from fiber optic cables or insulated transducers integrated within a rod or cable, or can include other sensors to detect and communicate combustion chamber data. Although not shown in FIG. 1, in other embodiments, the injector 101 can include other sensors or monitoring instrumentation located at various positions on the injector 101. For example, the body 113 can include optical fibers integrated into the material of the body 113. In addition, the flow valve 121 can be configured to sense or carry sensors to transmit combustion data to one or more controllers 129 associated with the injector 101. This data can be transmitted via wireless, wired, optical or other transmission mediums to the controller 129 or other components. Such feedback enables extremely rapid and adaptive adjustments for desired fuel injection factors and characteristics including, for example, fuel delivery pressure, fuel injection initiation timing, fuel injection durations for production of multi-layered or stratified charges, combustion chamber pressure and/or temperature, the timing of one, multiple or continuous plasma ignitions or capacitive discharges, etc. For example, the sensor 127 can provide feedback to the controller 129 as to whether the measurable conditions within the combustion chamber 105, such as temperature or pressure, fall within ranges that have been predetermined to provide desired combustion efficiency. Based on this feedback, the controller 129 in turn can direct the motion transfer system 150 to manipulate the frequency and/or degree of flow valve 121 actuation.

The motion transfer system 150 can take on numerous forms according to different embodiments of the disclosure and can transfer or modify motion of the driver 125, the actuator 123, the flow valve 121, and/or to other components of the fuel injector 101. In some embodiments, the motion transfer system 150 transfers motion directly to the actuator 123 by any of the means described above. The actuator 123 in turn opens the flow valve 121 in a stroke responsive to the motion transfer, thereby altering the fuel distribution rate and/or pressure. In some embodiments, the motion transfer system 150 transfers motion to the flow valve 121 directly.

Figure 2:
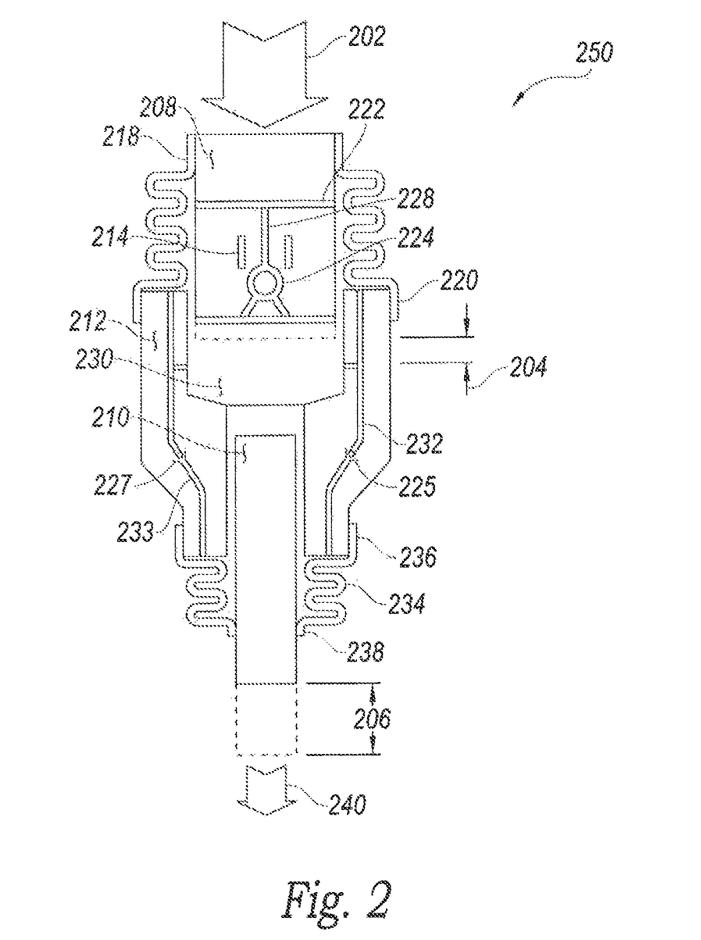
FIG. 2 is a cross-sectional side view of a motion transfer system for use in the injector of FIG. 1 and configured in accordance with embodiments of the technology.

FIG. 2 a cross-sectional side view of a motion transfer system 250 configured in accordance with embodiments of the technology. The system 250 can be used to transfer a force or linear motion to a reduced, equal, or greater magnitude. The system 250 can include a first piston 208 and second piston 210 that move within respective bores within a housing 212 in response to an initial force 202 applied directly or indirectly to the first piston 208. In some embodiments, one or both pistons 208, 210 move unidirectionally within the housing 212. A working fluid in a displacement zone 230 serves as a deformable medium and linkage to transfer the initial force 202 exerted through the first piston 208 to the second piston 210. In several embodiments, the displacement zone 230 comprises a fluid chamber or reservoir at least partially positioned between the first piston 208 and the second piston 210. In some embodiments, the fluid comprises silicone or fluorosilicone hydraulic oil. In other embodiments, the working fluid can be diesel fuel, gasoline, jet fuels, or other liquid fuels such as alcohols.

In an illustrative embodiment of operation, the initial force 202 on the first piston 208 produces pressure in the fluid in the displacement zone 230 that is approximately equivalent to the magnitude of the initial force 202 divided by a cross-sectional area $A_1$ (i.e., "effective area") of the first piston 208. The first piston 208 is moved by an initial displacement 204 by the initial force 202. The initial displacement 204 is amplified by the pressurized fluid in the displacement zone 230 to produce a greater magnitude of resulting displacement 206 in the second piston 210. The second piston 210 transfers this resulting displacement 206 via an output force 240.

The resulting displacement 206 is greater than the initial displacement 204 according to the ratio of the cross-sectional area $A_1$ of the first piston 208 divided by a cross-sectional area $A_2$ of the second piston 210. More specifically, the initial force 202 makes the first piston 208 move, causing displacement of a volume $V_1$ equaling the first piston's cross-sectional area $A_1$ multiplied by the initial displacement 204 of the first piston 208, to produce the resulting linear displacement 206 of the second piston 210. The resulting displacement 206 multiplied by the cross-sectional area $A_2$ of the second piston 210 is also equivalent to $V_1$, so the subsequent displacement 206 is larger than the initial displacement 204 of the first piston 208 according to the ratio of piston areas $A_1/A_2$. The resulting displacement 206 is approximately equal to the initial force 202 multiplied by the ratio of the piston's cross-sectional areas $A_2/A_1$, or the pressure in the fluid in the displacement zone 230 multiplied by the cross-sectional area of the second piston 210.

Referring to FIGS. 1 and 2 together, in some embodiments, the motion transfer system 250 can be used to modify an initial displacement of the actuator 123 to a different resulting displacement 206 of the flow valve 121. This enables a relatively small initial displacement 204 of the actuator 123 (such as motion generated by an piezoelectric, magnetostrictive, electromagnetic, electromechanical, pneumatic, or hydraulic valve driver 121) to be amplified by the motion transfer system 250 as needed for actuation of the flow valve 121 (i.e., the inward or outward opening of the flow valve 121). The motion transfer system 250 can also serve as a thermal expansion compensation linkage for assemblies such as the injector 101.

Leakage of fluid past the first piston 208 and/or the second piston 210 can be contained within one or more suitable reservoirs such as hermetically sealed upper bellows 228 and/or lower bellows 234. Each bellows 228, 234 can comprise a reservoir chamber. In some embodiments, the term "bellows" as used herein may include bellows that are spiral formed and that may perform spring actions where needed to improve desired operations. In some embodiments, an annular portion of the upper bellows 228 is welded, brazed, or otherwise sealingly attached to the first piston 208 at a first attachment point 218 and to the housing 212 at a second attachment point 220. Similarly, the lower bellows 234 can be sealingly attached to the housing 212 at a third attachment point 236 and to the second piston 210 at a fourth attachment point 238. Hermetically sealing the motion transfer system 250 can provide assurance that the fluid is provided continuously in the correct amount needed for motion transfer operations, and can greatly improve the internal protection of other components from contamination by the fluid that might otherwise eventually leak into potentially sensitive zones.

The upper and lower bellows 228, 234 may be connected via passageways 232, 233. Reloading the fluid from storage within the upper bellows 228 to the working fluid inventory in the displacement zone 230 can be done by pumping the first piston 208 to provide passage through a conduit 222 to the upper bellows 228 and past a check valve 224, which may be urged into a closed position by the action of the first piston 208 and/or by a suitable spring such as a magnet 214. Transferring the fluid that has accumulated within the lower bellows 234, by pumping the second piston 210, through passageways 232, 233 may be unidirectional as provided by check valves 225, 227. Thus, the fluid will be delivered from the lower bellows 234 to the upper bellows 228 for reloading the inventory of fluid in the displacement zone 230 as shown.

In certain embodiments, the upper and lower bellows 228, 234 are operated with preferred transfer rates that minimize the transfer of fluid past the first piston 208 compared to the allowed fluid transfer rate past the second piston 210. This provides for considerable heat transfer to and through the higher surface-to-volume passageways 232, 233 and through the housing 212. Heat can be generated in the motion transfer system 250 by friction and/or viscous losses as fluid inventory in the displacement zone 230 is rapidly moved and reshaped to translate the initial displacement 204 to the resulting displacement 206. The motion of the fluid within the passageways 232, 233 and the motion of the bellows 228, 234 provide assured heat transfers and remove excess heat. Ultimately such heat is removed from the fuel and/or other fluids that are circulated through the injector 101.

Figure 3:
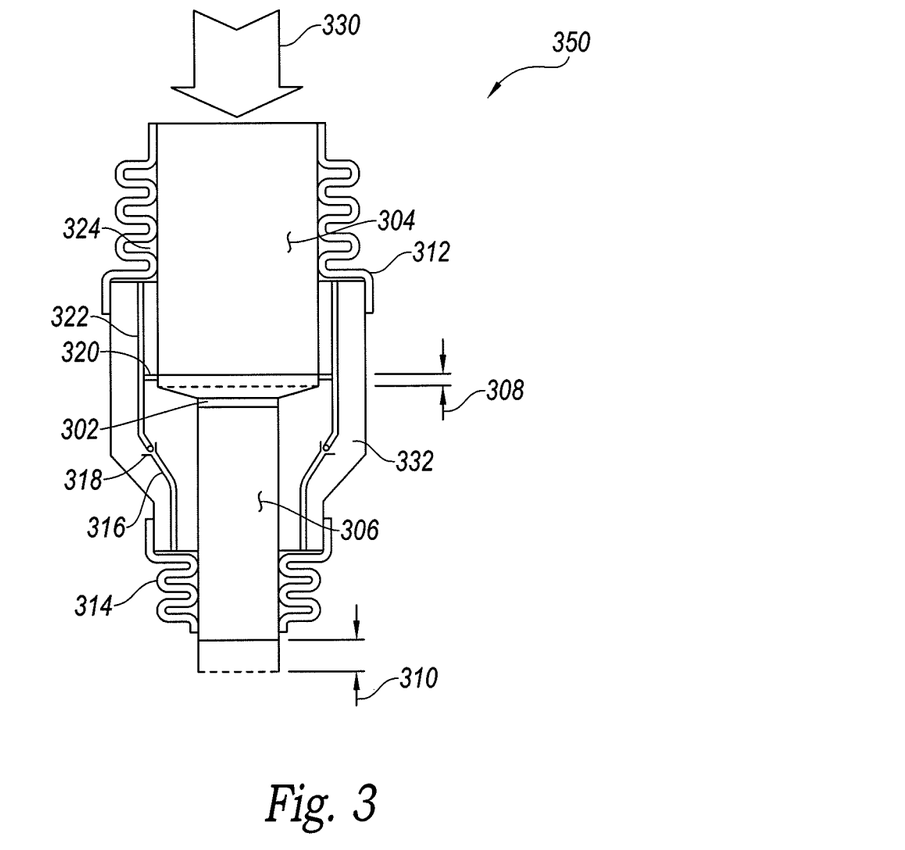
FIG. 3 a cross-sectional side view of a motion transfer system configured in accordance with embodiments of the technology.

FIG. 3 a cross-sectional side view of a motion transfer system 350 configured in accordance with embodiments of the technology. The motion transfer system 350 includes several features generally similar to the motion transfer system 250 described above. For example, the system 350 can include a larger piston 304 and smaller piston 306 that move within respective bores within a body 332 in response to an initial force 330 applied directly or indirectly to the larger piston 304. A working fluid in a displacement zone 302 serves as a deformable medium and linkage to transfer the initial force 330 exerted through the larger piston 304 to the smaller piston 306. In several embodiments, the displacement zone 302 comprises a fluid chamber or reservoir at least partially positioned between the larger piston 304 and the smaller piston 306. In operation, the larger piston 304 is moved by an initial displacement 308 by the initial force 330. The initial displacement 308 is amplified by the pressurized fluid in the displacement zone 302 to produce a greater magnitude of resulting displacement 310 in the smaller piston 306.

Fluid that leaks past the larger piston 304 and/or the smaller piston 306 can be contained within one or more suitable reservoirs such as hermetically sealed upper bellows 324 and/or lower bellows 314. In some embodiments, the bellows 314, 324 are spiral bellows. The bellows 314, 324 may be utilized to keep fuel constituents and/or particles and debris out of the clearances between the respective cylinder bores in the body 332. This can help ensure the smooth relative motion between components such as the larger piston 304 and the smaller piston 306.

The upper and lower bellows 324, 314 may be connected via passageways 316, 320, 322. Reloading the fluid from storage within the upper bellows 324 to the working fluid inventory in the displacement zone 302 in the manner described above can restart the operating cycle. Transferring the fluid that has accumulated within the lower bellows 314, by pumping the smaller piston 306, through passageway 316 may be unidirectional as provided by check valves 318.

Deformable substances in the displacement zone 302 can include water and ethylene or propylene glycol solutions, thixotropic fluids that produce low viscosity molecular movements upon application of deforming force, and rubber-like compositions that are readily reshaped to conform to space geometry changes. Thixotropic fluids can provide higher viscosity resistance to leakage along with greatly reduced viscosity when the shape of the occupied space is rapidly varied.

One exemplary embodiment of a thixotropic fluid is a solution of mostly water and a relatively small amount of an antifreeze agent that enables various live tissue cells to survive temperatures that ordinarily cause freeze rupture as water freezes. In some embodiments, agents such as a beta-mannopyranosyl-(1→4), a beta-xylopyranose backbone, and a fatty acid component may be utilized as an internal lubricant to provide desirable thixotropic viscosity and body. The lipid inventory may include types and portions that are covalently linked to the saccharide. Similarly, protein-like polymeric components may be utilized to further customize the internal lubrication and/or thixotropic performance.

Figure 4:
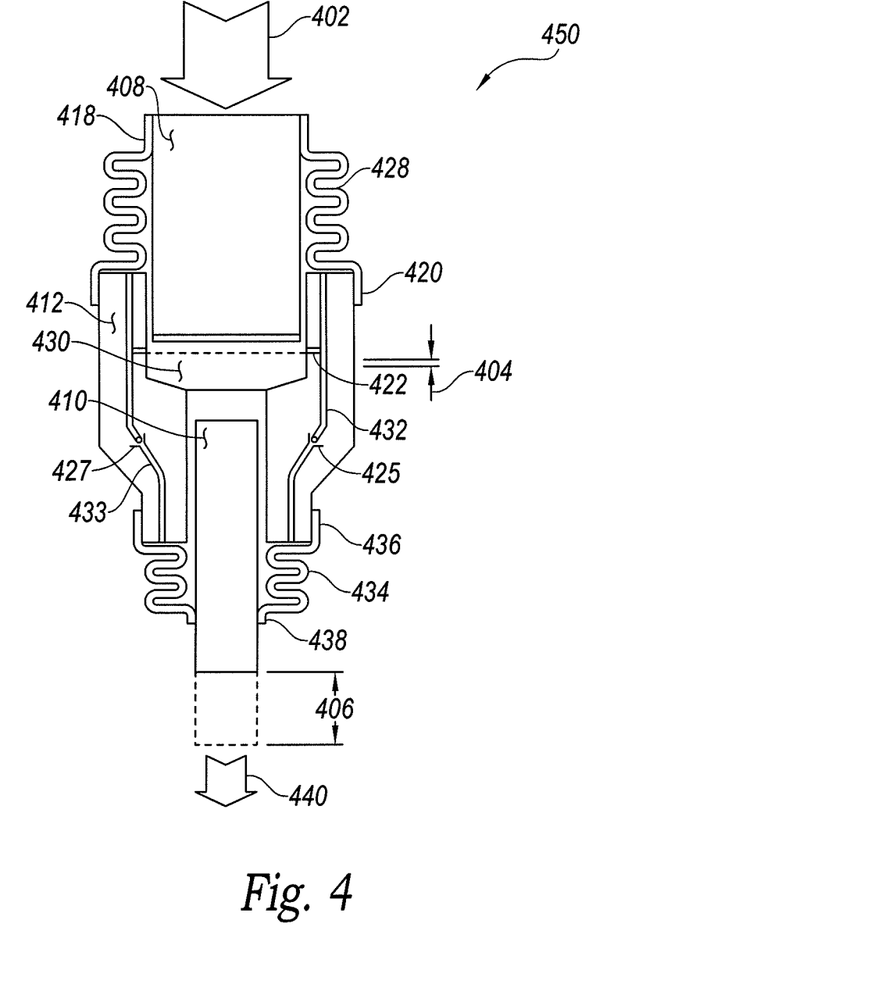
FIG. 4 a cross-sectional side view of a motion transfer system configured in accordance with embodiments of the technology.

FIG. 4 a cross-sectional side view of a motion transfer system 450 configured in accordance with embodiments of the technology. The motion transfer system 450 includes several features generally similar to the motion transfer system 250 described above. For example, the system 450 includes a first piston 408 and second piston 410 that move within respective bores within a body 412 in response to an initial force 402 applied directly or indirectly to the first piston 408. A working fluid in a displacement zone 430 serves as a deformable medium and linkage to transfer the initial force 402 exerted through the first piston 408 to the second piston 410. In several embodiments, the displacement zone 430 comprises a fluid chamber or reservoir at least partially positioned between the first piston 408 and the second piston 410. In operation, the first piston 408 is moved by an initial displacement 404 by the initial force 402. The initial displacement 404 is amplified by the pressurized fluid in the displacement zone 430 to produce a greater magnitude of resulting displacement 406 in the second piston 410.

Fluid leaking past the first piston 408 and/or the second piston 410 can be contained within one or more suitable reservoirs such as hermetically sealed upper bellows 428 and/or lower bellows 434. The upper bellows 428 can be hermetically sealed to the first piston 408 by a suitable annular braze, weld, or adhesive 418 and sealed to the body 412 by an annular seal 420. The lower bellows 434 can be sealed to the case 412 at a first annular seam 436 and sealed to the second piston 410 along a second annular seam 438.

The upper and lower bellows 428, 434 may be connected via passageways 432, 433. Reloading the fluid from storage within the upper bellows 428 to the working fluid inventory in the displacement zone 430 can be done by pumping the first piston 408 to provide passage through a conduit 422 to the upper bellows 428. This provides assured retention of the total requirement of fluid within the hermetically sealed system and transfer of fluid for maintenance of the inventory in the displacement zone 430 to assure adequate and sustained output force 440 in response to the initial displacement 404. Transferring the fluid that has accumulated within the lower bellows 434 by pumping the second piston 410 through passageway 433 may be unidirectional as provided by check valves 425, 427.

In certain embodiments, the upper and lower bellows 428, 434 are operated with preferred transfer rates that minimize the transfer of fluid past the first piston 408 compared to the allowed fluid transfer rate past the second piston 410. This provides for considerable heat transfer to and through the higher surface-to-volume passageways 432, 433 and through the housing 412. Heat can be generated in the motion transfer system 450 by friction and/or viscous losses as fluid inventory in the displacement zone 430 is rapidly moved and reshaped to translate the initial displacement 404 to the resulting displacement 406. The motion of the fluid within the passageways 432, 433 and the motion of the bellows 428, 434 provide assured heat transfers and removal of excess heat. Ultimately, such heat is removed from the fuel and/or other fluids that are circulated through the system 450.

Depending upon the spring rates of the upper bellows 428 compared to the lower bellows 434, the system 450 may provide considerable closing force of valves such as the flow valve 121 shown in FIG. 1. Further embodiments show the upper bellows 428 and/or the lower bellows 434 as helical spiral embodiments to minimize the volumes of fluid inventories that are deformed as a result of axial travel.

Figure 5:
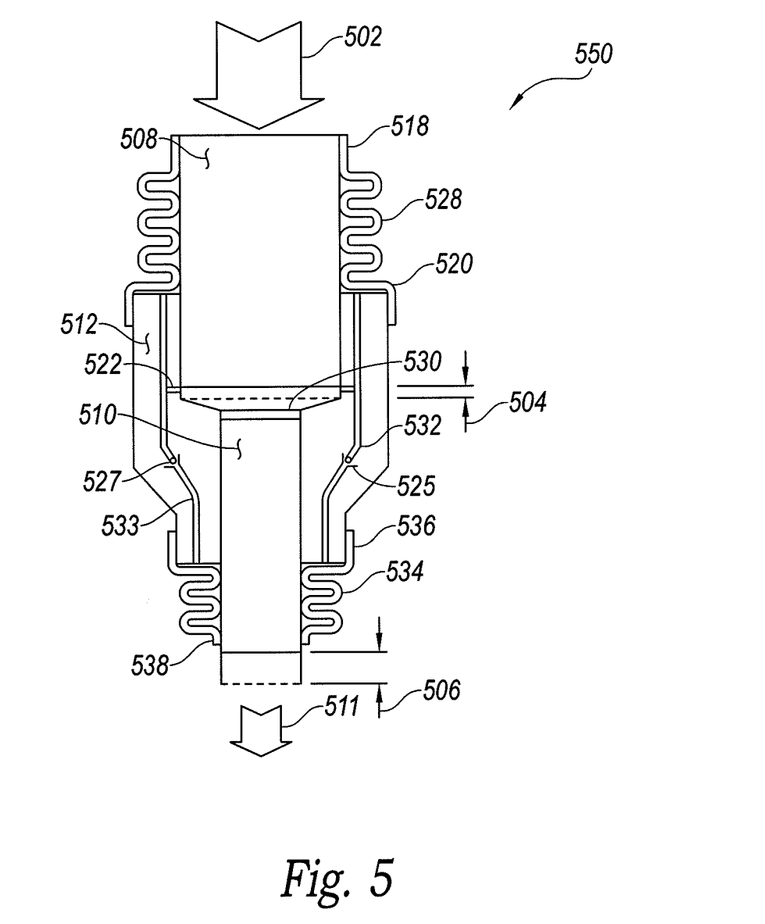
FIG. 5 a cross-sectional side view of a motion transfer system configured in accordance with embodiments of the technology.

FIG. 5 a cross-sectional side view of a motion transfer system 550 configured in accordance with embodiments of the technology. The motion transfer system 550 includes several features generally similar to the motion transfer system 250 described above. For example, the system 550 includes a first piston 508 and a second piston 510 on bores in a body 512. Fluid in a displacement zone 530 is displaced by axial motion of the first piston 508 and can transfer an input force 502 applied on the first piston 508 that moves an initial displacement 504. This causes a resulting amplified displacement 506 of the second piston 510 during an output force 511.

Spiral bellows 528, 534 can minimize the inventory of fluid that is displaced to enable faster operation and provide a greater surface-to-volume ratio for dissipation of heat generated by viscous and flexure losses. The spiral bellows 528 can be adhered and sealed to the first piston 508 by a first seal ring 518 and adhered and sealed to the body 512 by a second seal ring 520. Similarly, the spiral bellows 534 can be adhered and sealed to the second piston 510 at a third seal ring 538 and adhered and sealed to the body 512 by a fourth seal ring 536. These spiral bellows 528, 534 can provide reduced internal volumes compared to other bellows designs and enable greater cooling of fluid that is pumped by bellows actions through passageways 532, 533, check valves 525, 527, and passageway 522 to restore the inventory of working fluid to the displacement zone 530.

U.S. patent application Ser. No. 13/843,197, entitled "MECHANICAL MOTION AMPLIFICATION FOR NEW THERMODYNAMIC CYCLES," filed on Mar. 15, 2013, and U.S. patent application Ser. No. 13/839,178, entitled "HYDRAULIC DISPLACEMENT AMPLIFIERS FOR FUEL INJECTORS," filed on Mar. 15, 2013, are incorporated by reference herein in their entireties.

From the foregoing it will be appreciated that, although specific embodiments of the technology have been described herein for purposes of illustration, various modifications may be made without deviating from the spirit and scope of the technology. Further, certain aspects of the new technology described in the context of particular embodiments may be combined or eliminated in other embodiments. Moreover, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. Thus, the disclosure is not limited except as by the appended claims.

We claim:

1. A gaseous fuel injector, comprising:
   an actuator;
   a working volume reservoir adjustable between a first volume and a second volume smaller than the first volume;
   a combustion chamber valve in communication with the working volume reservoir and movable between a closed configuration when the working volume reservoir comprises the first volume and an open configuration when the working volume reservoir comprises the second volume; and
   a motion transfer system in operable connection with the actuator, the motion transfer system including—
   a plurality of pistons in communication with the working volume reservoir and configured to adjust the working volume reservoir from the first volume to the second volume, wherein the plurality of pistons includes a first piston and a second piston and a portion of the working volume reservoir is positioned between a bottom of the first piston and a top of the second piston; and
   a system of bellows and fluid passageways in connection with the working volume reservoir and configured to restore the working volume reservoir from second volume to the first volume,
   wherein the system of bellows and fluid passageways includes an upper bellows and a lower bellows,
   wherein the upper bellows is attached to the first piston and an upper portion of a housing and the lower bellows is attached to the second piston and a lower portion of the housing, and
   wherein the system of bellows and fluid passageways includes at least a first passageway for transferring working fluid in an upward direction from the lower bellows to the upper bellows for reloading the working fluid into the working volume reservoir.

2. The fuel injector of claim 1 herein the first piston has a different cross-sectional area than the second piston.

3. The fuel injector of claim 2 wherein the actuator acts on the first piston.

4. The fuel injector of claim 1 wherein the motion transfer system comprises a hermetically sealed system.

5. The fuel injector of claim 1, further comprising a one-way check valve disposed within the system of bellows and fluid passageways, and operative to allow fluid flow to the working volume reservoir.

6. The fuel injector of claim 1, further comprising a prime mover coupled to the actuator and configured to supply an initial motion to the actuator.

7. The fuel injector of claim 6 wherein the prime mover comprises at least one of a piezoelectric, magnetostrictive, electromagnetic, electromechanical, pneumatic, or hydraulic force generator.

8. The fuel injector of claim 2 wherein the cross-sectional area of the first piston is greater than the cross-sectional area of the second piston.

9. A motion transfer system comprising:
- a first piston and a second piston, wherein the first piston is decoupled from the second piston;
- a first bellows having a distal end and a proximal end;
- a second bellows having a distal end and a proximal end; and
- a housing having a distal end, a proximal end, and a fluid network therein,
- wherein the distal end of the first bellows is connected to the first piston and the proximal end of the bellows is connected to the distal end of the housing,
- wherein the distal end of the second bellows is connected to the second piston and the proximal end of the second bellows is connected to the proximal end of the housing,
- wherein the fluid network connects the first bellows and the second bellows,
- wherein a working volume reservoir is disposed between the first piston and the second piston, and
- wherein the fluid network transfers working fluid in an upward direction from the second bellows to the first bellows for reloading the working fluid into the working volume reservoir.

10. The motion transfer system of claim 9, wherein a cross-sectional area of the first piston is greater than a crass-sectional area of the second piston.

11. The motion transfer system of claim 9, wherein the first piston has a different cross-sectional area than the second piston.

12. The motion transfer system of claim 9, wherein the motion transfer system comprises a hermetically sealed system.

13. The motion transfer system of claim 9, further comprising a one-way check valve disposed within the fluid network and operative to allow working fluid flow to the working volume reservoir.

* * * * *